United States Patent Office 3,137,732
Patented June 16, 1964

3,137,732
STABILIZATION OF KETONES
Donald G. Kuper, Concord, Calif., assignor to Shell Oil Company, New York, N.Y., a corporation of Delaware
No Drawing. Filed Mar. 13, 1961, Ser. No. 95,046
4 Claims. (Cl. 260—593)

This invention relates to the treatment of ketones to improve their stability with respect to color and/or odor. It provides a commercially advantageous process for the production of ketones of high quality in these respects.

Liquid ketones are produced in large volume in this country for use as solvents and many other purposes. They are highly refined and are sold as essentially pure compounds or mixtures of pure compounds which are water white and free from undesirable odor. During storage and/or shipment, however, they are subject to discoloration and often develop undesirable odor. The exact nature of the changes which cause this degradation in the quality of the ketones is not known but they appear to take place progressively with increasing time under normal storage conditions so that, unless the ketones are used within a reasonably short time after their final purification, they may no longer be of a sufficiently high quality to be acceptable in their intended use.

It is an object of the present invention to provide a method whereby the foregoing disadvantages of ketone solvents can be avoided. A more specific object is the provision of a process for treating ketones to make them more resistant to development of objectionable odor and/or color during storage prior to use. A special object of the invention is the improvement of the color and odor stability of liquid ketones by a treatment in which no substantial conversion of the ketone takes place. Still other objects and advantages of the invention will be apparent from the following description of some of the suitable ways in which the new process can be carried out.

In accordance with the invention ketones of improved stability with respect to development of undesirable odor and/or color during storage are produced by subjecting the ketone, preferably after distillation, extraction or other treatment to make it meet the specifications for technically pure ketone, to a liquid phase catalytic hydrogenation treatment at a low temperature and pressure at which precursors of color and odor formation in storage are rendered innocuous without any substantial conversion of the ketone taking place.

Careful control of the hydrogenation treatment is necessary in order to achieve the desired improvement the Raney nickel as the catalyst. With this catalyst temperature, time of hydrogenation, hydrogen pressure and activity of the hydrogenation catalyst must be coordinated so as to bring about the desired improvement in stability of the ketone without excessive conversion of the ketone to alcohol. The best results have been obtained with the Raney nickel as the catalyst. With the catalyst temperatures in the range of about 70° to about 200° F., preferably about 75° to about 130° F., are advantageously used with hydrogenation times of about 5 minutes to about 2 hours, preferably about 5 to about 40 minutes, and a hydrogen pressure of about 40 to about 250 p.s.i.g., preferably about 50 to about 100 p.s.i.g. It is important to maintain a balance among these operating variables, using the shorter contact times and lower hydrogen pressures within these ranges at the higher indicated temperatures and vice versa. Departures from the indicated ranges must be made to compensate for differences in the activity of the chosen catalyst, more active catalysts than Raney nickel requiring less drastic conditions while more drastic conditions will be used with less active catalysts.

The hydrogenation treatment can be carried out in various ways. One suitable method comprises treatment of the liquid ketone with gaseous hydrogen in a stirred autoclave under pressure in the presence of suspended nickel catalyst. When using Raney nickel catalyst about 2 to about 100 grams of catalyst per liter of ketone charge is suitable, about 5 to about 40 grams per liter being preferable. Continuous, intermittent or batch-wise operation can be employed.

A more advantageous treatment method, especially for continuous operation, makes use of a stationary bed of self-supported catalyst for the hydrogenation. A suitable bed of this kind can be prepared by charging tablets of nickel-aluminum alloy to a reactor and treating them with caustic soda solution or the like to remove a sufficient amount of aluminum to activate the nickel. With such catalyst beds, it has been found more desirable to feed the ketone being treated down from the top countercurrent to the flow of the hydrogen which is admitted below the catalyst bed. The flow rate is adjusted to provide the residence times in contact with the catalyst in the previously indicated ranges. It is feasible, however, to operate with concurrent flow of ketone and hydrogen or in other ways which provide the required intimate contact of hydrogen with the ketone in the presence of the chosen hydrogenation catalyst under the previously indicated operating conditions.

After the completion of the hydrogenation treatment, the ketone should be redistilled to remove any remaining impurities and is then available for storage, shipment and use in a form which is stable to color and odor development under ordinary conditions of handling.

The following examples illustrate in more detail some of the suitable methods for carrying out the new stabilization treatment.

*Example I.—Stabilization of Methyl Ethyl Ketone*

Methyl ethyl ketone manufacture by dehydrogenation of secondary butyl alcohol and purified by two step distillation was found to develop an objectionable residual odor upon storage for a few weeks.

This ketone, from which water and lower boiling components had been removed, was treated with hydrogen in a stirred autoclave using a Raney nickel catalyst prepared by digesting nickel-aluminum alloy with caustic soda. Catalyst addition corresponded to 20 grams of undigested alloy per liter of crude ketone charged. The hydrogenation was carried out at 77° F. and 175 p.s.i.g. hydrogen for one and one-half hours. The ketone was then distilled off from higher boiling materials. Essentially quantitative recovery of the ketone was obtained. It was stored in glass and the odor was periodically tested in comparison with methyl ethyl ketone which had been distilled in the same way but had not been given the hydrogenation treatment. Comparisons were made by testing for residual odor after evaporating 10 ml. samples and showed that the unhydrogenated material developed a noticeable objectionable odor in 15 days of storage while the hydrogen treated ketone was odorfree and comparable to freshly distilled methyl ethyl ketone after 4 weeks.

*Example II.—Stabilization of Mesityl Oxide*

Mesityl oxide produced by dehydrating diacetone alcohol and subsequently distilling in three steps to remove water and impurities higher and lower boiling than the ketone was found to develop color during storage.

This mesityl oxide still containing water was treated with hydrogen using the apparatus employed in Example I. In different tests with suspended Raney nickel hydrogenation catalyst in the same proportion as in Example I and at the same temperature, 77° F., 50 to 100 p.s.i.g. of hydrogen was used for periods of 2 to 1½ hours. The treated ketone was distilled to take finished product overhead with essentially quantitative recovery. Color development during storage was measured in comparison to the similarly purified ketone which had not been hydrogenated. Both lots of ketone were initially water white and the hydrogenated ketone continued to meet shipping specifications (40 platinum-cobalt color maximum) after 4 weeks of storage or about twice as long as the unhydrogenated ketone.

*Example III.—Stabilization of 2-Methyl-2-Hydroxypentanone-4*

2-methyl - 2 - hydroxypentanone-4(diacetone alcohol) manufactured by condensing acetone using a basic catalyst and then purifying by two step distillation under reduced pressure, although initially water white, developed a yellowish coloration upon storage for a short time, the color becoming progressively more intense on continued storage. Five hundred milliliters of this ketone were hydrogenated in a stirred autoclave using a suspension of Raney nickel catalyst prepared by digesting 10 grams of nickel-aluminum alloy with caustic soda and employing 200 p.s.i.g. hydrogen pressure at 77° F. for one and one-half hours. After this hydrogenation treatment, the ketone was distilled at reduced pressure over rusty iron which increases the tendency toward discoloration. It was found that hydrogenated ketone could be stored ten times longer than the similarly distilled unhydrogenated ketone before color developed. The hydrogen-treated sample still had an acceptable color after 40 days' storage in glass, whereas the unhydrogenated ketone developed so much color in four days that it would not meet sales specifications.

Accelerated aging tests carried out in the presence of air at 212° F. showed that the ketone which had been distilled to remove lower boiling components only was likewise improved by hydrogenation. Tests using 125 p.s.i.g. hydrogen for 1½ hours at 77° C. with Raney nickel catalyst in the same proportion as in Example I, followed by fractionation in a 15 tray Oldershaw column gave distillates which remained colorless during 20 hours' aging at 212° F. Similarly treated unhydrogenated diacetone alcohol developed a color of 25 Pt–Co (Hazen) in this test, making it an unacceptable product. There was no loss of ketone in the treatment.

*Example IV.—Continuous Stabilization of Diacetone Alcohol*

Continuous stabilization of diacetone alcohol against color formation during storage was carried out using a bed of Raney nickel catalyst prepared in place in the reactor by circulating 45% aqueous sodium hydroxide solution for three hours through a bed of tableted 50 percent nickel–50 percent aluminum alloy in the form of 3/16 inch by 3/16 inch cylinders. A hydrogen pressure of 60 p.s.i.g. at 120° F. and a catalyst bed volume to flow rate of 2.1 cubic feet per gallon of liquid feed per minute corresponding to an average contact time of about 7½ minutes were used. Trickle-phase flow of the liquid over the irrigated bed of activated catalyst was employed with countercurrent flow of the hydrogen. Accelerated aging tests of the hydrogenated finished product in the presence of air and carbon steel at 212° F. have shown that ketone having acceptable color (15 Pt-Co maximum) after 10 weeks' normal storage is obtained, whereas the color of similarly treated unhydrogenated ketone aged under the same conditions exceeded shipping specifications after the equivalent of 2 weeks' storage. This increased color stability could be obtained with only 0.6% conversion of ketone to hexylene glycol while continuing to meet shipping dry point specifications without redistillation.

It will be seen that the new process offers many advantages over prior methods of ketone production and can be varied not only with respect to the particular ketones which can be stabilized but also in regard to the procedures employed in carrying out the new process. Thus, the invention is applicable to the stabilization of ketones as a class. It is especially successful in the treatment of aliphatic ketones having three to ten carbon atoms per molecule, particularly alkanones and alkenones having not more than one pair of multiple-bonded carbon atoms per hydrocarbon radical and not more than one carbonyl group per molecule. Examples of ketones other than those given in the foregoing, which can be successfully stabilized against development of color and odor by the new process, are, for instance, saturated ketones such as acetone, ethyl propyl ketone, diisopropyl ketone, methyl hexyl ketone, ethyl isoamyl ketone, methyl octyl ketone and the like and ethylenic ketones such as methyl vinyl ketone, methyl allyl ketone, ethyl isopropenyl ketone, 2-methyl-hepten-2-one-6, phorone, isophorone, etc. Corresponding ketones containing hydroxy or other substituents which are unreactive under the treating conditions can be stabilized by hydrogenation in the same way.

While the use of Raney nickel as the hydrogenation catalyst has been emphasized, the new method is not restricted thereto since any nickel catalyst having equivalent activity can be employed in the same way. Thus nickel alloy catalysts, particularly nickel-chromium and nickel-molybdenum catalysts prepared in a manner analogous to that used for production of Raney nickel catalysts as described in U.S. Patent 1,628,190, can be employed where desirable inert solvents for the ketone can be used but as a rule it is preferred to effect the hydrogenation treatment with a normally liquid ketone alone. Still other changes can be made in the process which is not limited to the methods which have been given by way of example only nor by any theory proposed in explanation of the improved results which are obtained.

I claim as my invention:

1. A process for stabilizing against changes in color and odor during storage, alkanone of 3 to 10 carbon atoms per molecule prepared by dehydrogenating the corresponding alcohol and distilling to remove impurities and obtain essentially pure ketone which is subject to the development of color and odor during storage, which comprises subjecting said purified ketone to catalytic hydrogenation treatment at a temperature in the range of about 70° to about 200° F., and a hydrogen pressure of about 40 to about 250 pounds per square inch gage, for about 5 to 120 minutes at which no substantial conversion of said ketone takes place in the presence of a nickel hydrogenation catalyst.

2. A process for stabilizing against changes in odor during storage, methyl ethyl ketone which has been prepared by dehydrogenating secondary butyl alcohol and distilling to produce essentially pure methyl ethyl ketone which is subject to development of objectionable odor during storage, which comprises treating said purified ketone with hydrogen in the presence of Raney nickel catalyst at a temperature in the range of about 70° to about 200° F., and a hydrogen pressure of about 40 to about 250 pounds per square inch gage, for about 5 to 120 minutes at which no substantial conversion of said ketone takes place.

3. A process for stabilizing against development of color during storage, mesityl oxide which has been prepared by dehydrating diacetone alcohol and distilling to remove impurities and obtain essentially pure mesityl oxide which is subject to the development of color during storage, which comprises treating the purified mesityl oxide with hydrogen in the presence of nickel hydrogenation catalyst at a temperature of about 70° to about 200° F., and a hydrogen pressure of about 40 to about 250 pounds per square inch gage, for about 5 to 120 minutes at which which no substantial conversion of the mesityl oxide takes place.

4. A process for stabilizing against development of color during storage, 2-methyl-2-hydroxy-pentanone-4 which has been made by condensing acetone with a basic catalyst, and distilling to the product to obtain water white, essentially pure 2-methyl-2-hydroxypentanone-4 which develops color during storage, which comprises treating the purified ketone with hydrogen in the presence of a nickel hydrogenation catalyst at a temperature of about 70° to about 200° F., and a hydrogen pressure of about 40 to about 250 pounds per square inch gage, for about 5 to 120 minutes at which no substantial conversion of the mesityl oxide takes place.

References Cited in the file of this patent

UNITED STATES PATENTS

| | | |
|---|---|---|
| 2,205,184 | Woodhouse | June 18, 1940 |
| 2,560,361 | Morrell et al. | July 10, 1951 |
| 2,570,157 | Rodman | Oct. 2, 1951 |